United States Patent
Xiao et al.

(10) Patent No.: US 12,190,864 B1
(45) Date of Patent: Jan. 7, 2025

(54) INTEREST-BASED CONVERSATIONAL RECOMMENDATION SYSTEM

(71) Applicant: Roku, Inc., San Jose, CA (US)

(72) Inventors: Fei Xiao, San Jose, CA (US); Amit Verma, Sunnyvale, CA (US); Rohit Mahto, San Jose, CA (US); Rameen Mahdavi, San Jose, CA (US); Nam Vo, San Jose, CA (US); Zidong Wang, San Jose, CA (US); Lian Liu, Rancho Palos Verdes, CA (US); Jose Sanchez, San Jose, CA (US); Pulkit Aggarwal, San Jose, CA (US); Atishay Jain, San Bruno, CA (US); Abhishek Bambha, Burlingame, CA (US); Ronica Jethwa, Mountain View, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/734,961

(22) Filed: Jun. 5, 2024

(51) Int. Cl.
  *G10L 15/06* (2013.01)

(52) U.S. Cl.
  CPC .... *G10L 15/063* (2013.01); *G10L 2015/0635* (2013.01)

(58) Field of Classification Search
  CPC .......... G10L 15/063; G10L 2015/0635; G10L 15/00; G10L 15/06; G10L 2015/0638; G10L 15/14
  See application file for complete search history.

(56) References Cited

U.S. PATENT DOCUMENTS

| | | | | |
|---|---|---|---|---|
| 10,854,206 B1* | 12/2020 | Liu | ............... | G06F 16/90332 |
| 11,157,488 B2* | 10/2021 | Feuz | ............... | G06N 20/00 |
| 11,181,988 B1* | 11/2021 | Bellegarda | ............... | G06F 3/04886 |
| 11,468,880 B2* | 10/2022 | Lin | ............... | G06N 3/006 |
| 2007/0250920 A1* | 10/2007 | Lindsay | ............... | G06F 21/31 |
| | | | | 726/7 |
| 2009/0319274 A1* | 12/2009 | Gross | ............... | G10L 17/22 |
| | | | | 704/260 |

(Continued)

*Primary Examiner* — Michael Colucci
(74) *Attorney, Agent, or Firm* — Sterne, Kessler, Goldstein & Fox P.L.L.C.

(57) ABSTRACT

Disclosed herein are system, method and/or computer program product embodiments, and/or combinations thereof, for training a conversational recommendation system. An embodiment generates a probabilistic pseudo-user neural network model based on at least one interest probability distribution corresponding to a pseudo-user profile. The embodiment trains, using the pseudo-user neural network model, the conversational recommendation system to learn a recommendation policy, where the conversational recommendation system includes an interest-exploration engine and a prompt-decision engine. The training includes performing an iterative learning process that includes selecting an interest-exploration strategy based on one or more of the following: an interest-exploration policy, an earlier pseudo-user response generated by the pseudo-user neural network model, content data, and pseudo-user interaction history. The embodiment then generates, using the trained conversational recommendation system, a real-time recommendation having high play probability based on the minimal number of iterations of conversation between a user and the trained conversational recommendation system.

20 Claims, 6 Drawing Sheets

(56) References Cited

U.S. PATENT DOCUMENTS

| | | | | |
|---|---|---|---|---|
| 2012/0184363 A1* | 7/2012 | Barclay | ............... | G07F 17/3244 |
| | | | | 463/25 |
| 2015/0281754 A1* | 10/2015 | Deen | .................. | H04N 21/6334 |
| | | | | 725/37 |
| 2018/0329998 A1* | 11/2018 | Thomson | ......... | H04N 21/42203 |
| 2023/0376697 A1* | 11/2023 | Chow | .................... | G06N 3/047 |

* cited by examiner

INTEREST-BASED CONVERSATIONAL RECOMMENDATION SYSTEM

BACKGROUND

Field

This disclosure is generally directed to conversational recommendation systems, and more particularly to training a recommendation using a probabilistic pseudo-user neural network model.

SUMMARY

Provided herein are system, apparatus, article of manufacture, method and/or computer program product embodiments, and/or combinations and sub-combinations thereof, for training an interest-based conversational recommendation system (ICRS) to generate a recommendation which has a high play-probability, based on a minimum number of iterations of conversation. One improvement for this ICRS is the reduction in iterations in conversation (prompting) between a user and the ICRS so that recommendations are not only accurate, but provided through a minimum number of prompts from a user.

Some aspects of this disclosure relate to a method for training an ICRS. According to some aspects, the method includes generating a probabilistic pseudo-user neural network model based on at least one interest probability distribution corresponding to a pseudo-user profile. According to some aspects, the pseudo-user neural network model is used to train the ICRS to learn a recommendation policy, where the ICRS comprises an interest-exploration engine and a prompt-decision engine, and where the training includes performing one of more iterations of an iterative learning process. According to some aspects, the iterative learning process can include selecting, by the interest-exploration engine, an interest-exploration strategy based on one or more of the following: an interest-exploration policy, an earlier pseudo-user response generated by the pseudo-user neural network model, content data, and pseudo-user interaction history. The iterative process can include selecting, by the prompt-decision engine, an interest prompt based on a prompt-decision policy and the selected interest-exploration strategy, and generating, by the pseudo-user neural network model, another pseudo-user response based on the selected interest prompt. The iterative process can further include updating a reward function, corresponding to the interest-exploration engine and the prompt-decision engine, based on the another pseudo-user response, and updating, using a reinforcement-learning method, the interest-exploration policy and the prompt-decision policy based on at least the updated reward function. According to some aspects, using the trained ICRS, a real-time recommendation having a high play-probability can then be generated based on the minimal number of iterations of conversation between a user and the trained ICRS.

According to some aspects, method further includes terminating the iterative learning process if the another pseudo-user response comprises accepting to play a recommended media content corresponding to the selected interest prompt. According to some aspects, the recommendation policy can correspond to the interest-exploration policy and the prompt-decision policy that cumulatively result in generating a pseudo-user response of accepting to play a recommended media content in a minimal number of iterations of the iterative learning process. According to some aspects, the at least one interest probability distribution can further include a long-term interest probability distribution and a short-term interest probability distribution corresponding to the pseudo-user profile. According to some aspects, the another pseudo-user response includes accepting to play a recommended media content corresponding to the selected interest prompt, quitting a conversation session with the conversational recommendation system, or generating a further pseudo-user response.

According to some aspects, updating the reward function can further include incrementing the reward function by a predetermined value if the another pseudo-user response includes accepting to play a recommended media content corresponding to the selected interest prompt, decrementing the reward function by a first value if the another pseudo-user response includes quitting a conversation session with the conversational recommendation system, or decrementing the reward function by a second value if the another pseudo-user response includes generating a further pseudo-user response. According to some aspects, selecting the interest-exploration strategy can further include extracting a current interest from the pseudo-user interaction history using named entity recognition and performing an interest prediction based on the current interest.

According to some aspects, selecting the interest-exploration strategy can further include selecting the interest-exploration strategy from a plurality of candidate interest-exploration strategies, including one or more of the following: exploration via an area target, exploration via a point target, exploration via a filtered target, exploration via a popular target, and exploration via a similar target. According to some aspects, a response generated by the pseudo-user neural network model can be processed by an automatic speech recognition module and a natural language understanding module before being received by the interest exploration engine. According to some aspects, an output of the prompt decision engine corresponding to the selected interest prompt can be processed by a large language model and a text to speech module before being received by the pseudo-user neural network model.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, article of manufacture, method and/or computer program product embodiments, and/or combinations and sub-combinations thereof, for training an interest-based conversational recommendation system (ICRS). For example, aspects herein describe generating a probabilistic pseudo-user neural network for training the ICRS offline using a reinforcement learning method with the goal of reducing the number of prompt interactions that is required for providing accurate recommendations to a user.

A content-based recommendation system analyzes real and synthetic/pseudo user data and available content characteristics to suggest relevant items to users. These items could be movies, TV shows, music, advertisement segments, or any media content recommended based on user preferences. A conversational recommendation system can obtain the dynamic preferences of users through real-time multi-turn interactions to recommend relevant items to users.

In some embodiments, the content-based recommendation system is implemented in a proprietary multimedia environment that runs a proprietary media operating system. Installed in the media system and managed by the media operating system may be multiple streaming applications, with each streaming application configured to provide access to separate streaming servers. In some embodiments, one or more of the streaming applications may also be proprietary, which means that user interactions within a proprietary streaming application may be prevented from being shared with the proprietary media operating system such that the media operating system does not have access to streaming data by each streaming application. Streaming applications may provide limited visibility into content items that are provided by each streaming applications. The media operating system may utilize the limited visibility to provide access to those content items in the streaming applications such using a search function provided by the media operating system. For example, the search function, which may be text or voice-based, may allow a user to search for content items. Media operating system may provide search results that include any streaming applications that provide the content item. Media operating system may provide access to the streaming applications that have the requested content item. Media operating system may track user interactions with the media operating system including all interactions that occur outside of the streaming applications, such as the user's search history and user's watch history with any applications that are also controlled and managed by the same entity that provides the media operating system.

Recommendation systems generally use machine-learning models to understand user interests, analyze data, and recommend movies or media content that is most relevant to a user's interests. Training a content-based recommendation system involves obtaining and analyzing past user behavior and preferences in order to generate accurate recommendations for users. Recommendation systems that operate in a specific domain (e.g., a multimedia environment for providing streaming services) can require an understanding of domain-specific user interests, content attributes, or features to provide meaningful personalized recommendations to users. However, a lack of domain-specific conversational training data can present challenges when developing conversational recommendation systems for specialized domains, such as a proprietary multimedia environment. In addition, new users may lack sufficient historical interest data, leading to a cold start problem where the recommendation system struggles to provide relevant suggestions.

Embodiments herein address the above issues by presenting techniques and mechanisms for training an ICRS offline using a pseudo-user model. The pseudo-user model can be a probabilistic neural network model generated based on a long-term interest probability distribution and a short-term probability distribution. The ICRS is trained, using the pseudo-user neural network model, to learn a recommendation policy that generates a user recommendation, that has a high play-probability, based on a minimal number of iterations of conversation between the user and the ICRS. The trained ICRS can be used online to generate real-time recommendations.

Figure 1:
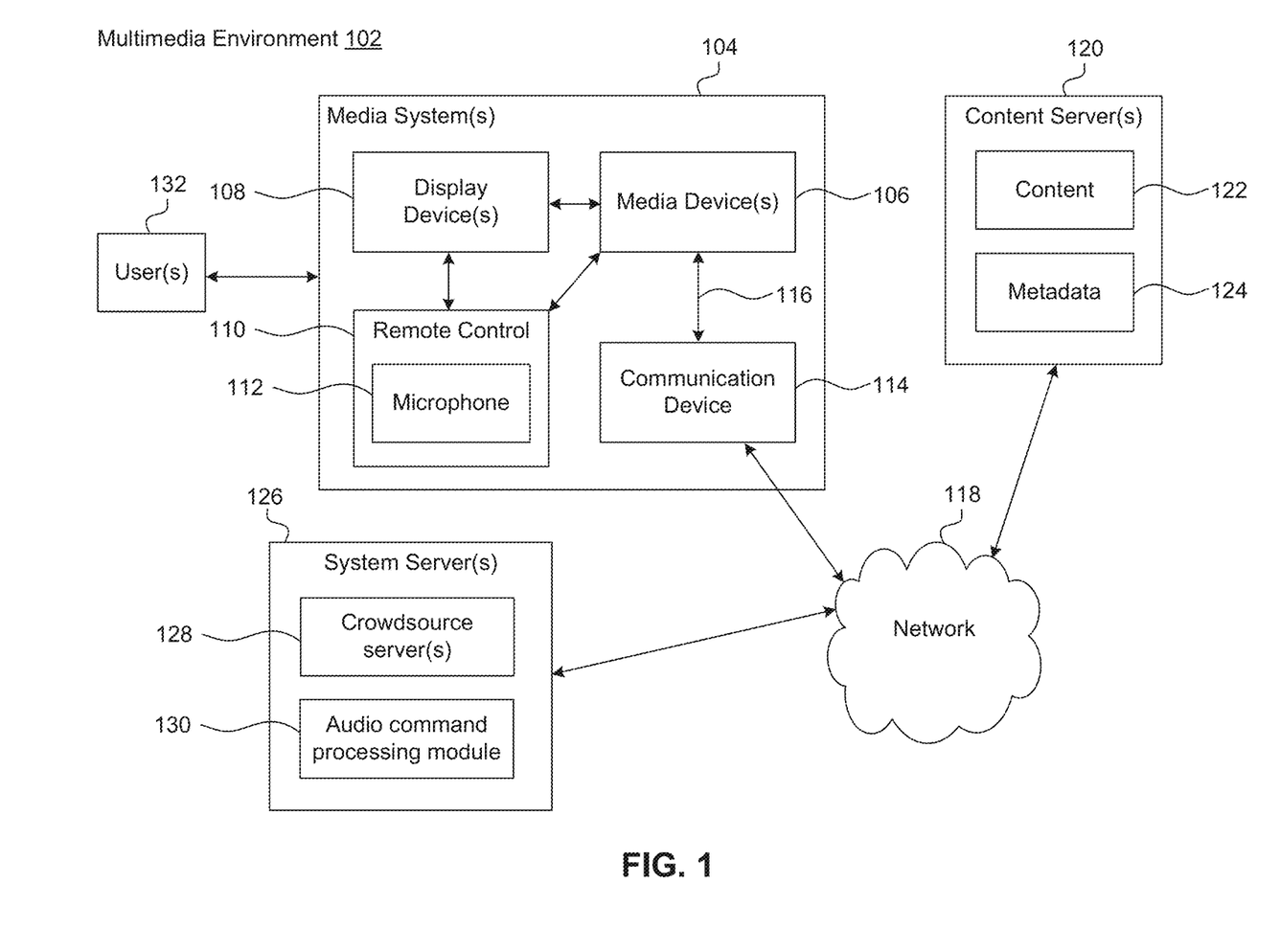
FIG. 1 illustrates a block diagram of a multimedia environment, according to some embodiments.

Various aspects of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

Multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108. In some embodiments, image capturing device 134 may be operatively coupled to, and/or connected to media system 104 and communicate to content server(s) 120 and/or system server(s) 126 via media system 104. In some aspects, image-capturing device 134 may communicate directly with content server(s) 120 and/or system server(s) 126 without needing to communicate via media system 104.

Each media device 106 may be configured to communicate with network 118 via a communication device 114. Communication device 114 may include, for example, a cable modem or satellite TV transceiver. Media device 106 may communicate with communication device 114 over a link 116, wherein link 116 may include wireless (such as Wi-Fi) and/or wired connections.

In various embodiments, network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. Remote control 110 can be any component, part, apparatus and/or method for controlling media device 106 and/or display device 108, such as a remote control, a tablet, laptop computer, smartphone, wearable, on-screen controls, integrated control buttons, audio controls, or any combination thereof, to name just a few examples. In an embodiment, remote control 110 wirelessly communicates with media device 106 and/or display device 108 using cellular, Bluetooth, infrared, etc., or any combination thereof. Remote control 110 may include a microphone 112, which is further described below.

Multimedia environment 102 may include a plurality of content servers 120 (also called content providers, channels or sources). Although only one content server 120 is shown in FIG. 1, in practice multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to content 122. Metadata 124 may also or alternatively include links to any such information pertaining or relating to content 122. Metadata 124 may also or alternatively include one or more indexes of content 122.

Multimedia environment 102 may include one or more system servers 126. System servers 126 may operate to support media devices 106 from the cloud. It is noted that the structural and functional aspects of system servers 126 may wholly or partially exist in the same or different ones of system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streaming of the movie.

The system servers 126 may also include an audio command processing module 130. As noted above, remote control 110 may include microphone 112. Microphone 112 may receive audio data from users 132 (as well as other sources, such as the display device 108). In some embodiments, media device 106 may be audio responsive, and the audio data may represent verbal commands from user 132 to control media device 106 as well as other components in media system 104, such as display device 108.

In some embodiments, the audio data received by microphone 112 in remote control 110 is transferred to media device 106, which then forwards the audio data to audio command processing module 130 in system servers 126. Audio command processing module 130 may operate to process and analyze the received audio data to recognize a verbal command of user 132. Audio command processing module 130 may then forward the verbal command back to media device 106 for processing.

Figure 2:
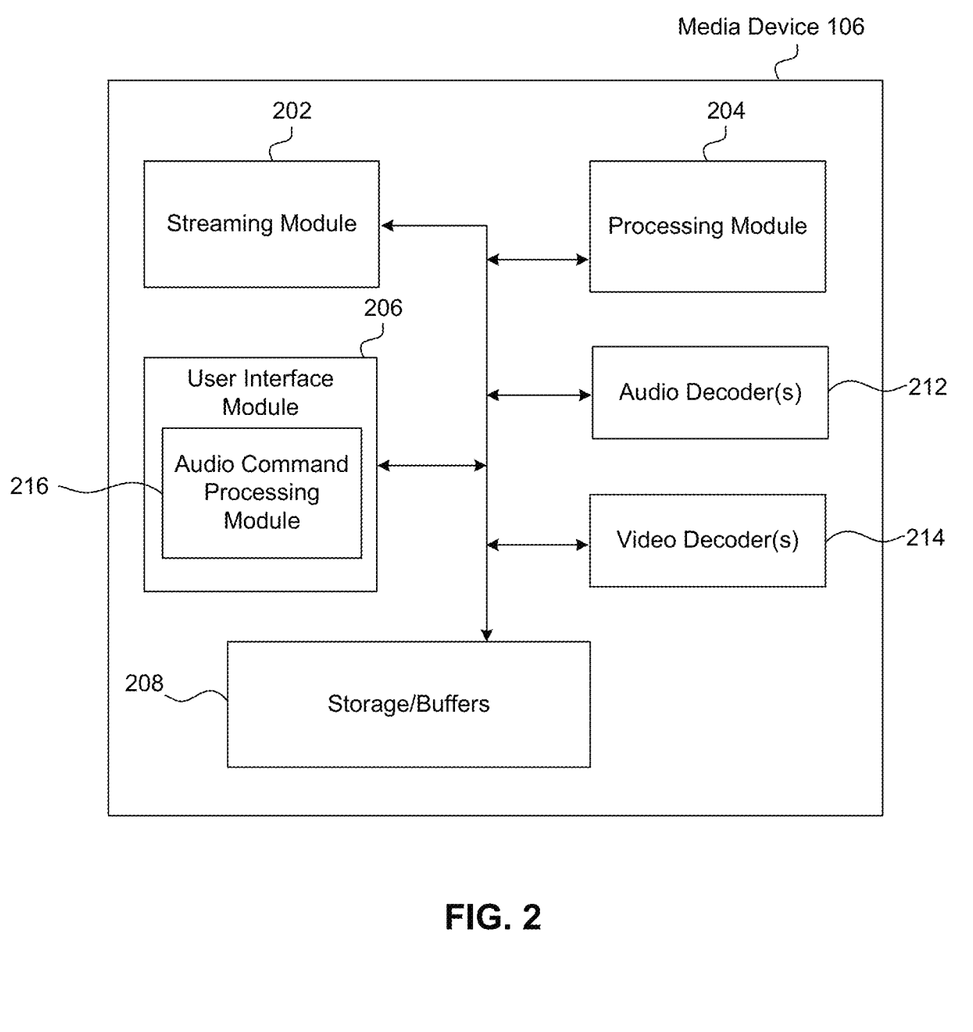
FIG. 2 illustrates a block diagram of a streaming media device, according to some embodiments.

In some embodiments, the audio data may be alternatively or additionally processed and analyzed by an audio command processing module 216 in media device 106 (see FIG. 2). Media device 106 and system servers 126 may then cooperate to pick one of the verbal commands to process (either the verbal command recognized by audio command processing module 130 in system servers 126, or the verbal command recognized by audio command processing module 216 in media device 106).

FIG. 2 illustrates a block diagram of an example media device 106, according to some embodiments. Media device 106 may include a streaming module 202, a processing module 204, storage/buffers 208, and a user interface module 206. As described above, user interface module 206 may include audio command processing module 216.

Media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Streaming module 202 of media device 106 may be configured to receive image information from image capturing device 134. In some aspects, the image information may comprise LECI frame generated by a low-power processor of the image-capturing device 134. In some aspects, the image information may comprise a sequence of image frames recorded by the image-capturing device 134 and an indication (e.g., a flag, a bit in a header of a packet) that the media device 106 can generate a LECI frame from the provided image information. For example, processing module 204 may receive the sequence of image frames from image capturing device 134 and generate a LECI frame from the provided sequence. In this manner, image-capturing device 134 may offload LECI processing to the media device 106. For example, image-capturing device 134 may determine it lacks sufficient processing power or electrical power (e.g., a low battery) to generate LECI frames and, instead, transmits the recorded sequence of image frames to media device 106.

Now referring to both FIGS. 1 and 2, in some embodiments, user 132 may interact with media device 106 via, for example, remote control 110. For example, user 132 may use remote control 110 to interact with user interface module 206 of media device 106 to select a content item, such as a movie, TV show, music, book, application, game, etc. In response to the user selection, streaming module 202 of media device 106 may request the selected content item from content server(s) 120 over network 118. Content server(s) 120 may transmit the requested content item to streaming module 202. Media device 106 may transmit the received content item to display device 108 for playback to user 132.

In some aspects, media device 106 may display an interface for interacting with the sequence of image frames provided by image capturing device 134. For example, the interface may display selectable options for generating LECI frames based on the sequence of image frames. One example of a selectable option is the duration of time (e.g., 1 minute, 5 minutes) of the sequence of images for which to generate the LECI images. Another example includes the types of annotations or effects (e.g., arrows, heat maps, highlighting, blurring) to be added to the LECI to represent actions or objects detected within the frames of the sequence of frames.

In streaming embodiments, streaming module 202 may transmit the content item to display device 108 in real time or near real time as it receives such content item from content server(s) 120. In non-streaming embodiments, media device 106 may store the content item received from content server(s) 120 in storage/buffers 208 for later playback on display device 108.

Interest-Based Conversational Recommendation System

Figure 3:
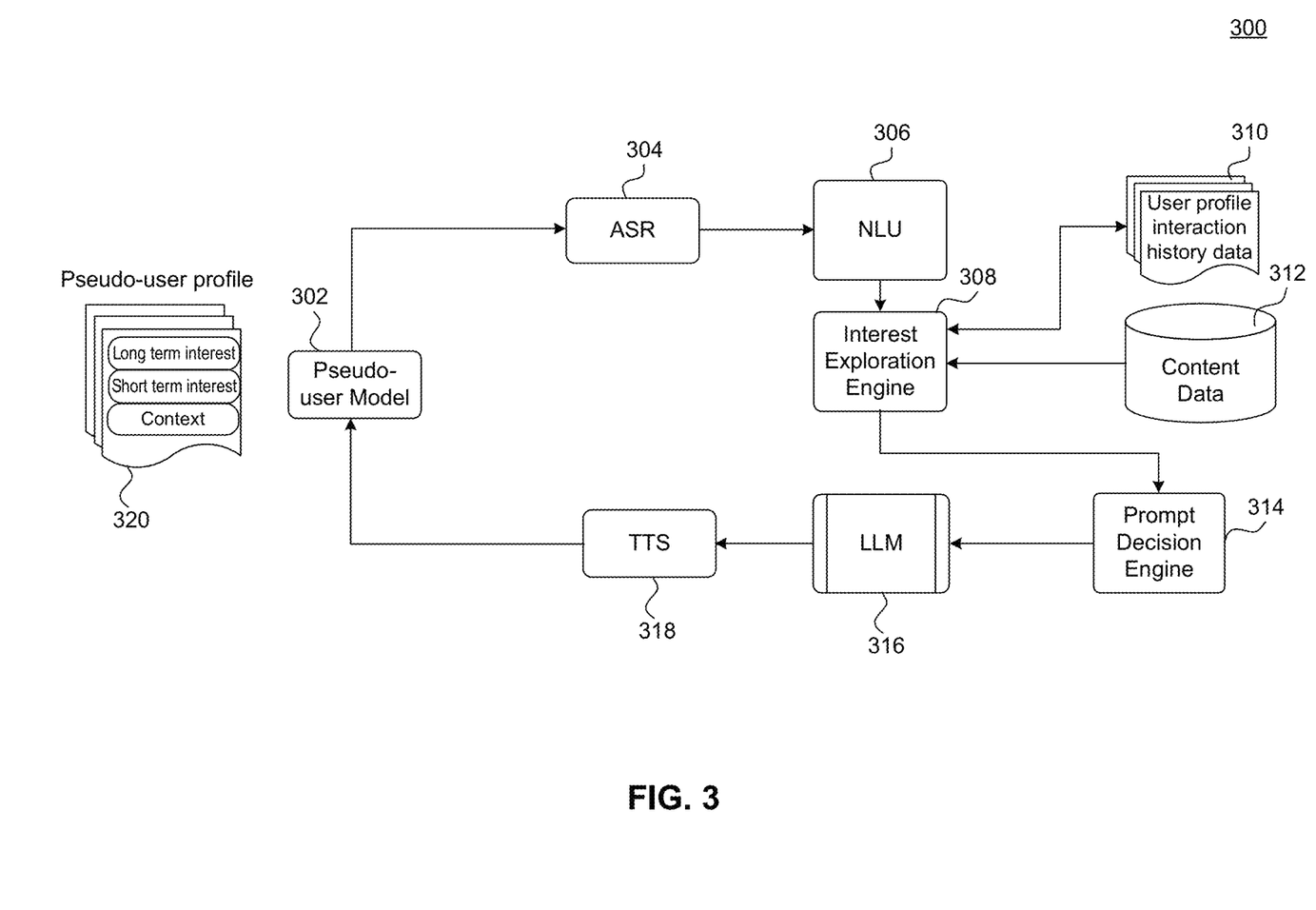
FIG. 3 illustrates a block diagram of an example system for training an ICRS, according to some embodiments.

FIG. 3 illustrates a block diagram of an example system 300 for offline training of an ICRS, according to some aspects of this disclosure. According to some aspects, system 300 can be configured to communicate with media system 104, content server(s) 120, or system server(s) 126 in multimedia environment 102 of FIG. 1.

According to some aspects, the ICRS includes speech recognition (ASR) module 304, natural language understanding (NLU) module 306, interest exploration engine 308, prompt decision engine 314, large language model (LLM) network 316, and text to speech module (TTS) module 318. According to some aspects, interest exploration engine 308 and prompt decision engine 314 can be neural network models that are trained using pseudo-user model 302. Interest exploration engine 308 has access to user profile interaction history data 310 and content data 312 (e.g., content 122).

According to some aspects, pseudo-user model 302 can be a neural network generated based on a long-term interest probability distribution and a short-term interest probability distribution. Pseudo-user model 302 can be generated by training a neural network based on a logged datasets corresponding to pseudo-user profile 320. According to some aspects, pseudo-user model 302 can be LLM based. According to some aspects, multiple pseudo-user models can be generated where each pseudo-user model can correspond to a respective pseudo-user profile. According to some aspects, an ICRS can be trained using multiple pseudo-user models where the responses from the multiple pseudo-user models can be combined to provide probabilistic interest responses. According to some aspects, a pseudo-user profile can include logged datasets corresponding to a single user. Alternately, a pseudo-user profile data can include logged datasets corresponding to several users belonging to a class of users. According to some aspects, user classes can be determined based user's age-group, sex, and/or primary language of communication. The pseudo-user model 302 can generate interest responses that follow the long-term interest probability distribution and a short-term interest probability distribution obtained based on the pseudo-user profile.

According to some aspects, the logged datasets corresponding to pseudo-user profile 320 may include logged sequences of interactions between users and content servers 120. Logged dataset can also include logged sequences of interactions between a user and a recommender system providing recommendations regarding content 122. From the logged dataset, interest entities corresponding to long-term interests and short-term interests can be identified (e.g., using a named entity recognition technique). According to some aspects, the data sets can include information corresponding to long-term interests and/or short-term interests corresponding to a user. Alternatively, the data sets can include information corresponding to long-term interests and/or short-term interests corresponding to several users that belong to a class of users. Additionally, in embodiments where pseudo-user model 302 is implemented as an LLM, pseudo-user model 302 can learn user interests by interacting with the user (e.g., by displaying interest questions to the user). Pseudo-user model 302 interacts with ICRS which identifies media content to recommend to the user based on the minimal number of iterations of conversation/interactions with the user. Furthermore, another prompt decision engine can be used by pseudo-user model 302 to further optimize pseudo-user queries to efficiently identify media content of interest in a minimum number of iterations. For example, a sequence of models that include pseudo-user model 302 and a prompt decision engine may be utilized to optimize questions that are displayed to the user. The first model may generate a first user question that is fed to the prompt decision engine for refining the question further. This combination of pseudo-user model 302 and a prompt decision engine provides a technical improvement to the generation of prompts by refining them through multiple rounds prior to displaying them to the user.

According to some aspects, pseudo-user model 302 can be trained to generate responses corresponding to a long-term interest entity based on the probability distribution of the long-term interest entity. The probability distribution of the long-term interest entity can be obtained from the logged datasets of pseudo-user profile 320. As an example, a long-term interest entity can be an actor-name corresponding to the media content that is accessible via the multimedia environment 102. For each pseudo-user profile, a watch probability can be assigned to each actor to define the probability distribution function of the actor-name interest entity. According to some aspects, pseudo-user model 302 can be trained to generate responses corresponding to a short-term interest entity based on the probability distribution of the short-term interest entity. The probability distribution of the short-term interest entity can be obtained from the logged datasets of pseudo-user profile 320. As an example, a short-term interest entity can be movie-genre corresponding to the movies that are accessible via the multimedia environment 102 over the past week. For each pseudo-user profile, a watch probability can be assigned to each genre to define the probability distribution function of the short-term movie-genre interest entity.

According to some aspects, interest exploration engine 308 and prompt decision engine 314 together act as a learning agent to identify an optimal recommendation policy based, in part, on the interactions and responses from pseudo-user model 302. According to aspects, the recommendation policy may comprise an interest-exploration policy and a prompt-decision policy. The interest-exploration policy and the prompt decision policy define the behavior of interest exploration engine 308 and prompt decision engine 314, respectively, as they interact with pseudo-user model 302.

According to some aspects, interest exploration engine 308 maintains an interest-exploration policy that can be updated based on the feedback received during interactions with pseudo-user model 302. Interest-exploration policy determines the action taken by interest exploration engine 308 based on a state of pseudo-user model 302, as perceived by interest exploration engine 308. According to some aspects, due to the probabilistic nature of pseudo-user model 302, interest exploration engine 308 may not have information regarding the exact state of pseudo-user model 302. A state of pseudo-user model 302 at a given time can correspond to the current situation or configuration of pseudo-user model 302 as estimated or perceived by interest exploration engine 308. The state of pseudo-user model 302 includes information corresponding to the responses generated by the pseudo-user model 302 in response to the queries or recommendations received from TTS module 318. According to some aspects, the state of pseudo-user model 302 can correspond to trajectories of interactions and responses of pseudo-user model 302.

According to some aspects, the interest-exploration policy can define an action interest exploration engine 308 can take for each estimated state of pseudo-user model 302. For example, the interest-exploration policy defines what interest exploration strategy the interest exploration engine 308 can select and/or what interest exploration query the interest exploration engine 308 can generate when it encounters a particular state of pseudo-user. According to some aspects, an interest exploration strategy can specify the trajectory of questions to ask and how to adjust the recommendation based on the response from pseudo-user model 302. Interest exploration engine 308 iteratively learns an interest-exploration policy based on responses from pseudo-user model 302, user profile interaction history 301, and content data 312.

According to some aspects, based on a response generated by pseudo-user model 302 and the perceived state of pseudo-user model 302, interest exploration engine 308 can decide to perform an action (e.g., select an interest exploration strategy) that corresponds to exploring pseudo-user's interest in an area target. Interest exploration engine 308 can generate a broad question related to an area target and subsequently ask narrower questions corresponding to the area target. For example, an area target can be a movie genre, and interest exploration engine 308 can generate a query to identify a genre of movies that matches the interests of pseudo-user model 302. During subsequent iterations of the reinforcement learning process, interest exploration engine 308 can generate a query to identify a specific range of years for movies in the identified genre that matches the interests of pseudo-user model 302.

According to some aspects, based on a response generated by pseudo-user model 302 and the perceived state of pseudo-user model 302, interest exploration engine 308 can decide to select an interest exploration strategy that corresponds to exploring pseudo-user's interest in a point target. For example, interest exploration engine 308 can generate a query to identify a specific movie title that matches the interests of pseudo-user model 302. According to some aspects, based on a response generated by pseudo-user model 302 and the perceived state of pseudo-user model 302, interest exploration engine 308 can decide to perform an action that corresponds to exploring pseudo-user's interest in a filter target. For example, interest exploration engine 308 can generate a query to identify aspects of a previous recommendation that did not match the interests of pseudo-user model 302.

According to some aspects, based on a response generated by pseudo user model 302 and the perceived state of pseudo-user model 302, interest exploration engine 308 can decide to select an interest exploration strategy that corresponds to exploring pseudo-user's interest in a popular or new target. For example, interest exploration engine 308 can generate a query to check if the pseudo-user model 302 indicates an interest in exploring a list of current top movies or a list of new movies. According to some aspects, based on a perceived current state of pseudo-user model 302, interest exploration engine 308 can decide to generate an interest exploration query that corresponds to exploring pseudo-user's interest in similar targets. For example, interest exploration engine 308 can generate a query to identify other movies or actors that are similar to the movies/actors that match the interests of pseudo-user model 302.

According to some aspects, interest exploration engine 308 can iteratively learn an optimal interest-exploration policy using a reinforcement learning method. According to some aspects, interest exploration policy can decide whether to continue to ask another question to gain more certainty regarding an interest or whether to generate a recommendation based on an estimation of the current interest of the pseudo-user profile.

According to some aspects, an optimal interest-exploration policy can have an objective of increasing the probability of obtaining a pseudo-user response of accepting to play a recommended media content (i.e., maximizing the play-probability of a recommended media content) in a minimal number of iterations of conversation between a user and the ICRS. According to some aspects, a reward function can be defined to quantify how well each output generated by interest exploration engine 308 contributes to achieving the objective of learning an optimal recommendation policy, including an optimal interest-exploration policy.

According to some aspects, the interest-exploration policy is parameterized by a set of parameters, and the interest exploration engine 308 can learn the parameters to maximize an expected cumulative value of a reward function. According to some aspects, the interest-exploration policy selects actions of interest exploration engine 308 probabilistically. For example, given a pseudo-user model state, the interest-exploration policy determines a probability distribution over various possible actions and selects an action that can maximize the reward function.

According to some aspects, interest exploration engine 308 uses the output of NLU module 306 (e.g., entity identifier, intent, and action) and information from user profile interaction history 310 and content data 312 to generate an interest exploration strategy. The interest exploration strategy can specify the trajectory of questions to ask and how to adjust the recommendation based on the response from pseudo-user model 302. For example, interest exploration engine 308 can decide whether to continue to ask another question to gain more certainty regarding an interest or whether to generate a recommendation based on an estimation of current interest of the pseudo-user profile. According to some aspects, interest exploration engine 308 can determine a strategy to balance exploration and exploitation. For example, a user may have prior exposure to only a few movie out of the entire dataset, and a large number of media that the user may be interested in may remain unseen by the user. In such a case, interest exploration engine 308 can determine a strategy to recommend the user to explore unseen movie titles.

According to some aspects, to improve the probability of obtaining a pseudo-user response of accepting to play a recommended media content (i.e., a recommendation with a high play-probability) in a minimal number of interactions, a higher reward is assigned to actions that result in pseudo-user model's response of accepting to play a recommended media content. According to some aspects, the reward function can be incremented when pseudo-user model 302 generates a response of accepting to play a recommended media content (e.g., selecting or clicking the recommended movie). According to some aspects, the reward function can be incremented by a predefined value when the recommended media content is played for a period exceeding a threshold duration. According to some aspects, the reward function can be decremented by a predefined value when pseudo-user model 302 generates a response of quitting a conversation or interaction session with interest exploration engine 308 and prompt decision engine 314. According to some aspects, the reward function can be decremented another predefined value if pseudo-user model 302 generates a pseudo-user response that requires another iteration of interaction with pseudo-user model 302. For example, pseudo-user response that requires another iteration of interaction with pseudo-user model 302 may include requesting further information regarding a recommendation or responding to a question regarding an interest area.

According to some aspects, prompt decision engine 314 maintains prompt-decision policy that can be updated based on the output of the interest exploration engine 308 and the feedback received during interactions with pseudo-user model 302. Prompt-decision policy determines the action taken by prompt decision engine 314 based on a state of pseudo-user, as perceived by prompt decision engine 314 and interest exploration engine 308. The state of pseudo-user model 302 can correspond to trajectories of interactions between pseudo-user model 302 and prompt decision engine 314 and interest exploration engine 308, and responses of pseudo-user model 302.

According to some aspects, the prompt-decision policy can define what action interest prompt decision engine 314 can take when it encounters a particular state of pseudo-user model 302. For example, the prompt-decision policy defines what prompt generation strategy the prompt decision engine 314 can select when it encounters a particular state of pseudo-user. Prompt decision engine 314 can iteratively learn a prompt generation policy based on responses from pseudo-user model 302 and the interest exploration strategies and/or queries generated by interest exploration engine 308.

ASR module 304 receives the responses (e.g., audio responses) generated by pseudo-user model 302 and performs speech to text conversion. According to some aspects, ASR module 304 can use machine-learning algorithms and statistical models to analyze audio input, extract relevant features of the speech content, and transcribe it into a written text output. The output generated by ASR module 304 can be input to NLU module 306.

According to some aspects, NLU module 306 processes the text input from the ASR module 304 and extracts relevant information, semantics, and intent to understand and interpret the language in a meaningful way. According to some aspects, NLU module 306 uses named entity extraction techniques to identify and extract named entities mentioned in the text, such as actors, genres, movie titles, dates, and numerical expressions. The output of the NLU module 306 can include a list of entities mentioned along with their types and spans in the text. According to some aspects, NLU module 306 can categorize the text input from the ASR module 304 into specific intents or actions. The output may include the identified intent or action label, such as 'play the movie,' 'search new shows,' or 'add to my list.'

According to some aspects, the output of the prompt decision engine 314 is sent through LLM network 316 and TTS module 318 before being input to pseudo user model 302. According to some aspects, using LLM 316 allows interaction with the pseudo-user model 302 in a conversational manner. For example, LLM network 316 can convert the interest prompts generated by prompt decision engine 314 into conversational queries or recommendations. TTS module 318 can be used to convert the conversational queries or recommendations generated by LLM network 316 into speech for input to pseudo-user model 302.

According to some aspects, after training the ICRS offline using pseudo-user model 302, the ICRS can be used for online interactions with users. According to some aspects, a trained ICRS can be used to generate real-time recommendations based on the minimal number of iterations of conversation/interactions with a user. According to some aspects, a trained ICRS can be assigned to a user based on the pseudo-user model 302 used to train the ICRS. According to some aspects, if pseudo-user model 302 is generated based on a pseudo-user profile with logged datasets corresponding to a single user, the trained ICRS model can be used to generate real-time recommendations having a high play-probability using a minimal number of iterations of conversation between the user and the trained ICRS. According to some aspects, if pseudo-user model 302 is generated based on a pseudo-user profile with logged datasets corresponding to multiple users belonging to a specific class of users, the trained ICRS model can be used to generate real-time recommendations for a user that belongs to the specific class. According to some aspects, when a user accesses the media system 104, the user can be classified based on one or more attributes. For example, the class of the user can be determined based on user's age group, sex, and/or primary language of communication and the user is assigned a trained ICRS based on the class to which the user belongs. For example, a user belonging to a specific age group can be assigned an ICRS that is trained using a pseudo-user model 302 that is generated based on data sets corresponding to one or more users belonging to the specific age group.

According to some aspects, once the ICRS is online, it can be continuously improved via further online training based on real-time user feedback interactions. By further training ICRS online, it can constantly adapt to user preferences and deliver personalized recommendations in real time. According to some aspects, ICRS can submit additional prompts to a user after the user selects his content. ICRS can receive responses to the additional prompts and uses those responses for further training. Alternatively or additionally, ICRS can be trained passively online, using reinforcement learning, based on whether the user has selected the recommended content. According to some aspects, the recommendation policy is positively reinforced when the user selects the recommended content, and the recommendation policy is negatively reinforced when the user does not select the recommended content or terminates the interaction session with the ICRS. ICRS can use online learning algorithms that can adapt to new data while preserving knowledge from past observations. For example, techniques such as stochastic gradient descent, online matrix factorization, and adaptive regularization techniques can be used for online training. According to some aspects, the trained ICRS can be hosted locally on the user's media system 104. Alternately, the trained ICRS can be implemented remotely at content servers 120 or system servers 126. In order to provide real-time recommendations to millions of users concurrently, multiple ICRS can be implemented using distributed computing frameworks and scalable infrastructure.

Figure 4:
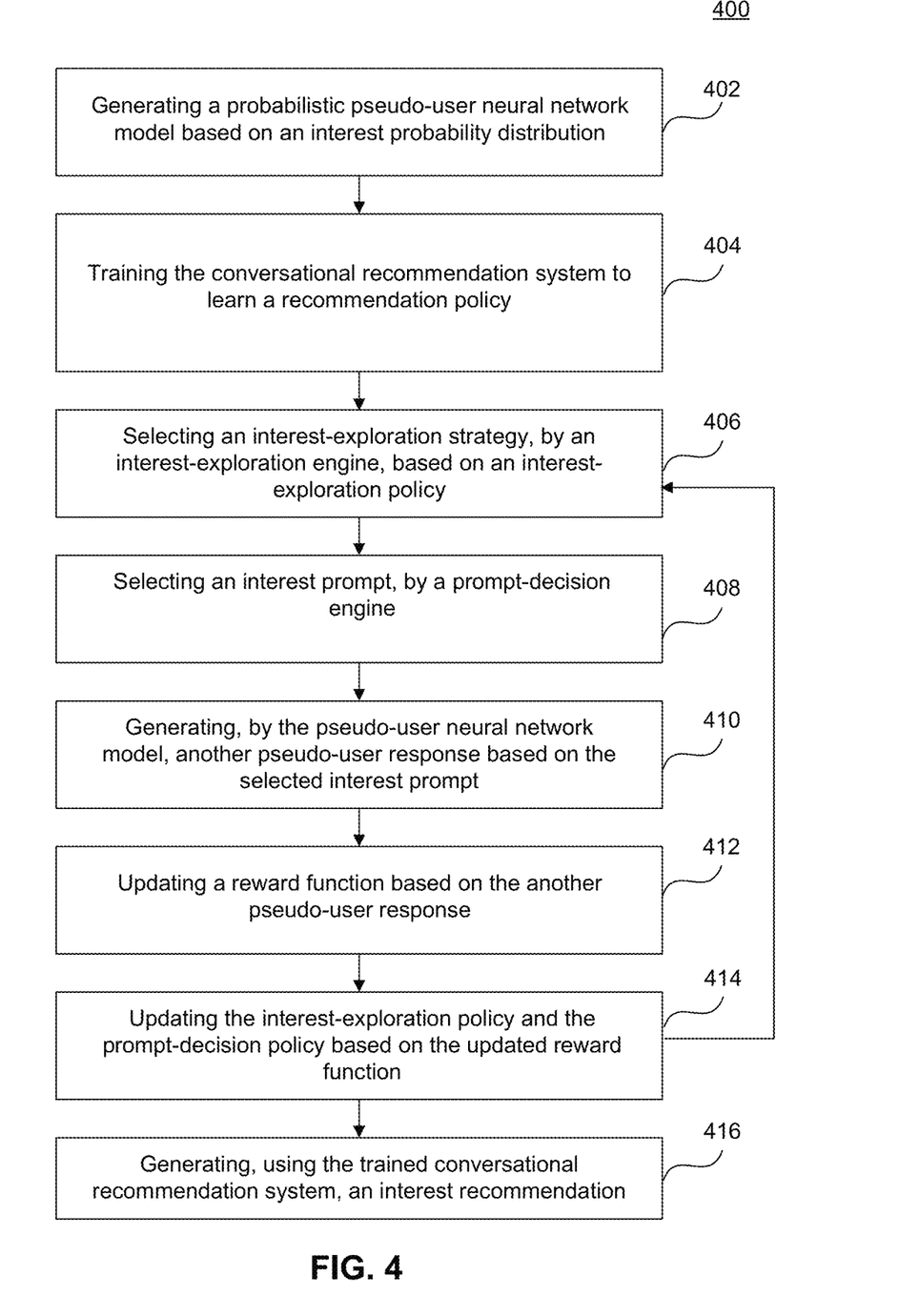
FIG. 4 illustrates a flow diagram of a method for offline training of an ICRS, according to some embodiments.

FIG. 4 is a flow diagram for a method 400 for training an ICRS for generating an output, having a high play-probability, based on a minimal number of iterations of conversation, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall first be described with reference to the embodiment of system 300 for offline training of an ICRS, depicted in FIG. 3, although method 400 is not limited to that embodiment.

In 402, a probabilistic pseudo-user neural network model is generated based on at least one interest probability distribution corresponding to a pseudo-user profile. According to some aspects, pseudo-user model 302 can be generated by training a neural network based on logged datasets corresponding to pseudo-user profile 320. According to some aspects, pseudo-user model 302 can be a LLM based. Additionally or alternatively, in embodiments where pseudo-user model 302 is implemented as an LLM, pseudo-user model 302 can learn user interests by interacting with the user (e.g., by displaying interest questions to the user). Pseudo-user model 302 interacts with ICRS which identifies media content to recommend to the user based on the minimal number of iterations of conversation/interactions with the user. Furthermore, another prompt decision engine can be used by pseudo-user model 302 to further optimize pseudo-user queries to efficiently identify media content of interest in a minimum number of iterations. For example, a sequence of models that include pseudo-user model 302 and a prompt decision engine may be utilized to optimize questions that are displayed to the user. According to some aspects, a pseudo-user profile can include logged datasets corresponding to a single user. Alternately, a pseudo-user profile data can include logged datasets corresponding to several users belonging to a class of users. According to some aspects, user classes can be determined based user's age-group, sex, and/or primary language of communication. The pseudo-user model 302 can be trained to generate interest responses that follow the long-term interest probability distribution and a short-term interest probability distribution obtained based on the pseudo-user profile.

In 404, using the pseudo-user neural network model, an ICRS is trained to learn a recommendation policy. The ICRS can include an interest-exploration engine 308 and a prompt-decision engine 314. The training of ICRS includes performing one or more iterations of an iterative learning process, as in 406-414. According to aspects, the recommendation policy may comprise an interest-exploration policy and a prompt-decision policy. The interest-exploration policy and the prompt decision policy define the behavior of interest exploration engine 308 and prompt decision engine 314, respectively, as they interact with pseudo-user model 302.

In 406, interest-exploration engine 308 selects an interest-exploration strategy based on one or more of the following: an interest-exploration policy, an earlier pseudo-user response generated by the pseudo-user neural network model, content data 312, and pseudo-user interaction history 310. According to some aspects, interest exploration engine 308 can iteratively learn an optimal interest-exploration policy using a reinforcement learning method. According to some aspects, an interest exploration strategy can specify the trajectory of questions to ask and how to adjust the recommendation based on response from pseudo-user model 302. Interest exploration engine 308 iteratively learns an interest-exploration policy based on earlier responses from pseudo-user model 302, user profile interaction history 310 and content data 312. According to some aspects, user profile interaction history can include information from multiple streaming application and multimedia platforms. According to some aspects, user profile interaction history 310 can include information corresponding to watched media content (e.g., watched movies, TV shows, sports content, and news programs) related to a user profile. Furthermore, user profile interaction history 310 can contain information regarding actors, genres, watch duration, and other metadata corresponding to the watched media content. According to some aspects, the user profile related to user profile interaction history 310 can correspond to a single user or a class of users. According to some aspects, content data 312 can include movies, TV programs, and other media content that are accessible via multimedia environment 102.

According to some aspects, interest exploration engine 308 can select an interest exploration strategy that corresponds to exploring pseudo-user's interest in an area target. Interest exploration engine 308 can generate a broad question related to an area target and subsequently ask narrower questions corresponding to the area target. According to some aspects, interest exploration engine 308 can decide to select an interest exploration strategy that corresponds to exploring pseudo-user's interest in a point target. For example, interest exploration engine 308 can generate a query to identify a specific movie title that matches the interests of pseudo-user model 302. According to some aspects, interest exploration engine 308 can decide to select an interest exploration strategy that corresponds to exploring pseudo-user's interest in a popular or new target. For example, interest exploration engine 308 can generate a query to check if the pseudo-user model 302 indicates an interest in exploring a list of current top movies or a list of new movies.

In 408, prompt-decision engine 314 selects an interest prompt based on a prompt-decision policy and the selected interest-exploration strategy. According to some aspects, prompt-decision policy determines the action taken by prompt decision engine 314 based on a state of pseudo-user model 302, as perceived by prompt decision engine 314 and interest exploration engine 308. The state of pseudo-user model 302 can correspond to trajectories of interactions between pseudo-user model 302 and prompt decision engine 314 and interest exploration engine 308, and responses of pseudo-user model 302.

In 410, pseudo-user neural network model, generates another pseudo-user response based on the selected interest prompt. According to some aspect, a pseudo-user response can include accepting to play a recommended media content corresponding to the selected interest prompt. According to some aspects, a pseudo-user response can be quitting a conversation session with ICRS (i.e., terminating a conversation with interest exploration engine 308 and prompt decision engine 314). According to some aspects, a pseudo-user response can include generating a further pseudo-user response and/or query.

In 412, a reward function corresponding to the interest-exploration engine and the prompt-decision engine is updated based on another pseudo-user response (e.g., an earlier response). According to some aspects, updating the reward function can include incrementing the reward function by a predetermined value if the another pseudo-user response comprises accepting to play a recommended media content corresponding to the selected interest prompt. According to some aspects, updating the reward function can include decrementing the reward function by a first value if the another pseudo-user response corresponds to quitting a conversation session with ICRS. According to some aspects, updating the reward function can include decrementing the reward function by a second value if the another pseudo-user response comprises generating a further pseudo-user response.

In 414, the interest-exploration policy and the prompt-decision policy are updated using a reinforcement-learning method based on at least the updated reward function. According to some aspects, the iterative learning process of 406-414 can be terminated if the another pseudo-user response corresponds to accepting to play a recommended media content corresponding to the selected interest prompt.

In 416, the trained ICRS generates a real-time recommendation having a high play-probability based on the minimal number of iterations of conversation between a user and the trained conversational recommendation system. According to some aspects, a trained ICRS can be assigned to a user based on the pseudo-user model 302 used to train the ICRS. Furthermore, once the trained ICRS is online, it can be continuously improved via further online training based on real-time interest feedback from the user.

Figure 5:
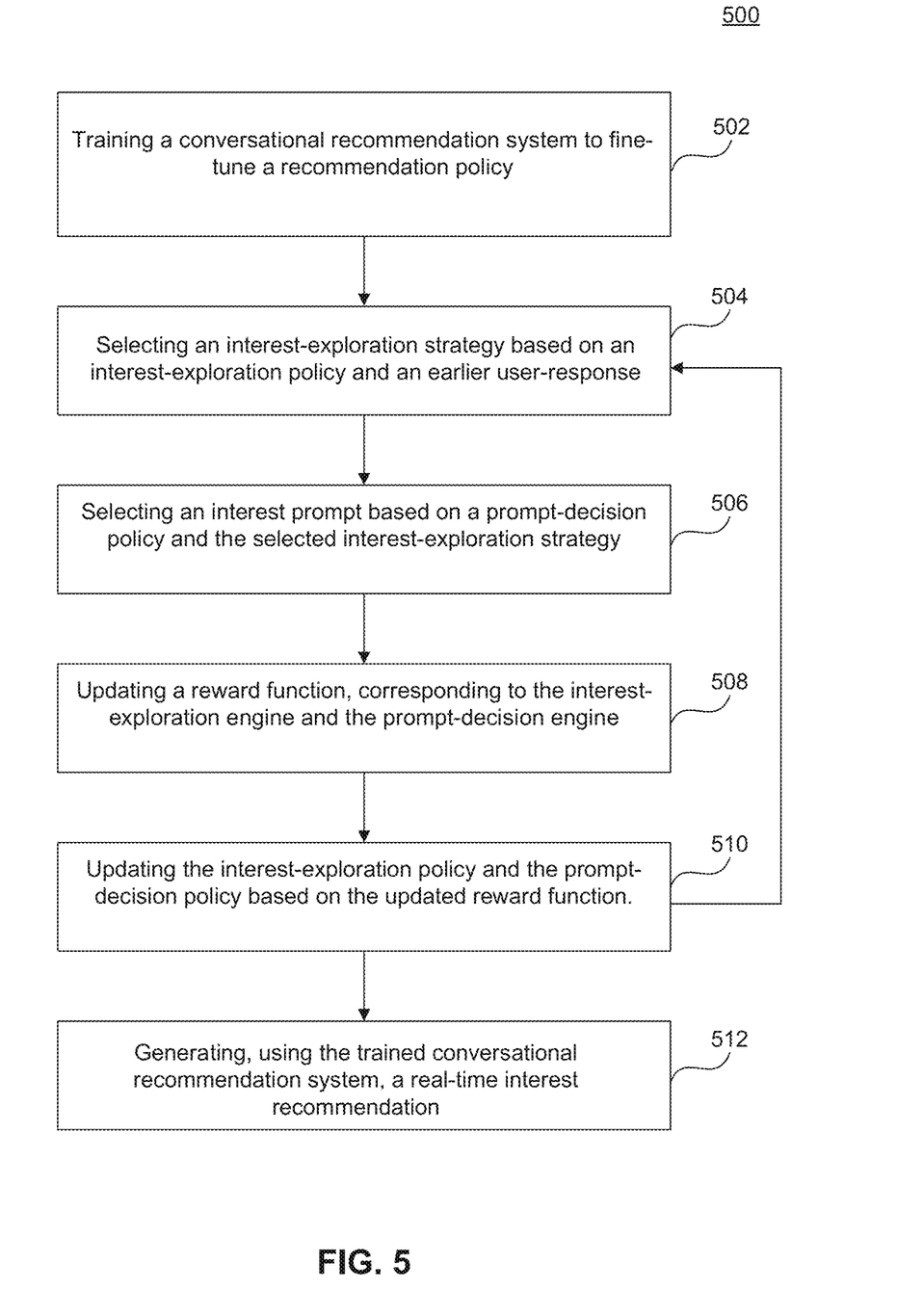
FIG. 5 illustrates a flow diagram of a method for online training of a trained ICRS, according to some embodiments.

FIG. 5 is a flow diagram for method 500 for online training of a trained ICRS for generating an output, having a high play-probability, based on a minimal number of iterations of conversation, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously or in a different order than shown in FIG. 5, as will be understood by a person of ordinary skill in the art.

Method 500 shall first be described with reference to the embodiment of system 300 for offline training of an ICRS, depicted in FIGS. 3 and 4, although method 500 is not limited to those embodiments.

In 502, a trained ICRS is further trained online to fine-tune a recommendation policy. According to some aspects, an ICRS is trained offline, using a pseudo-user neural network, as described in 404-414 of FIG. 4. The trained ICRS can include an interest-exploration engine 308 and a prompt-decision engine 314. According to aspects, the recommendation policy may comprise an interest-exploration policy and a prompt-decision policy. The interest-exploration policy and the prompt-decision policy define the behavior of interest-exploration engine 308 and prompt-decision engine 314, respectively, as they interact with a user online in real time. The trained ICRS can be deployed online to provide real-time interest recommendations to a user. Once deployed online, the trained ICRS can be continuously improved via further online training based on real-time interest feedback from the online user. Online training of the trained ICRS includes performing one or more iterations of an iterative learning process, as in 504-510.

In 504, interest-exploration engine 308 of the trained ICRS selects an interest-exploration strategy based on one or more of the following: an interest-exploration policy, an earlier user-response, content data 312, and user interaction history. According to some aspects, interest exploration engine 308 can iteratively learn and refine an optimal interest-exploration policy using a reinforcement learning method. According to some aspects, an interest exploration strategy can specify the trajectory of questions to ask a user and how to adjust the interest recommendation based on the response from the user. Interest exploration engine 308 iteratively fine-tunes an interest-exploration policy based on earlier responses from the user, user profile interaction history 310 and content data 312. According to some aspects, user profile interaction history can include information from multiple streaming application and multimedia platforms. According to some aspects, user profile interaction history 310 can include information corresponding to watched media content (e.g., watched movies, TV shows, sports content, and news programs) related to a user profile. Furthermore, user profile interaction history 310 can contain information regarding actors, genres, watch duration, and other metadata corresponding to the watched media content. According to some aspects, the user profile related to user profile interaction history 310 can correspond to a single user or a class of users. According to some aspects, content data 312 can include movies, TV programs, and other media content that are accessible via multimedia environment 102.

According to some aspects, interest exploration engine 308 of the trained ICRS can select an interest exploration strategy that corresponds to exploring the online user's interest in an area target. Interest exploration engine 308 can generate a broad question related to an area target and subsequently ask narrower questions corresponding to the area target. According to some aspects, interest exploration engine 308 can decide to select an interest exploration strategy that corresponds to exploring online user's interest in a point target. For example, interest exploration engine 308 can generate a query to identify a specific movie title that matches the interests of the online user. According to some aspects, interest exploration engine 308 of the trained ICRS can decide to select an interest exploration strategy that corresponds to exploring the online user's interest in a popular or new target. For example, interest exploration engine 308 can generate a query to check if the online user indicates an interest in exploring a list of current top movies or a list of new movies. In 506, prompt-decision engine 314 of the trained ICRS selects an interest prompt based on a prompt-decision policy and the selected interest-exploration strategy. According to some aspects, prompt-decision policy determines the action taken by prompt decision engine 314 based on a state of the online user, as perceived by prompt decision engine 314 and interest exploration engine 308. The state of the online user can correspond to trajectories of interactions between the online user and prompt decision engine 314 and interest exploration engine 308, and responses of the online user.

In 508, a reward function corresponding to the interest-exploration engine and the prompt-decision engine of the trained ICRS is updated based on another response from the user (e.g., an earlier response). According to some aspects, updating the reward function can include incrementing the reward function by a predetermined value if the another user response comprises accepting to play a recommended media content corresponding to the selected interest prompt. According to some aspects, updating the reward function can include decrementing the reward function by a first value if the another user response corresponds to quitting a conversation session with ICRS. According to some aspects, updating the reward function can include decrementing the reward function by a second value if the another user response comprises generating a further user response.

In 510, the interest-exploration policy and the prompt-decision policy of the trained ICRS are updated and fine-tuned using a reinforcement-learning method based on at least the updated reward function. According to some aspects, the iterative online learning process of 504-510 can be terminated if the another user response corresponds to accepting to play a recommended media content corresponding to the selected interest prompt.

In 512, the trained ICRS generates a real-time interest recommendation having a high play-probability based on the minimal number of iterations of conversation between the online user and the trained ICRS.

Example Computer System

Figure 6:
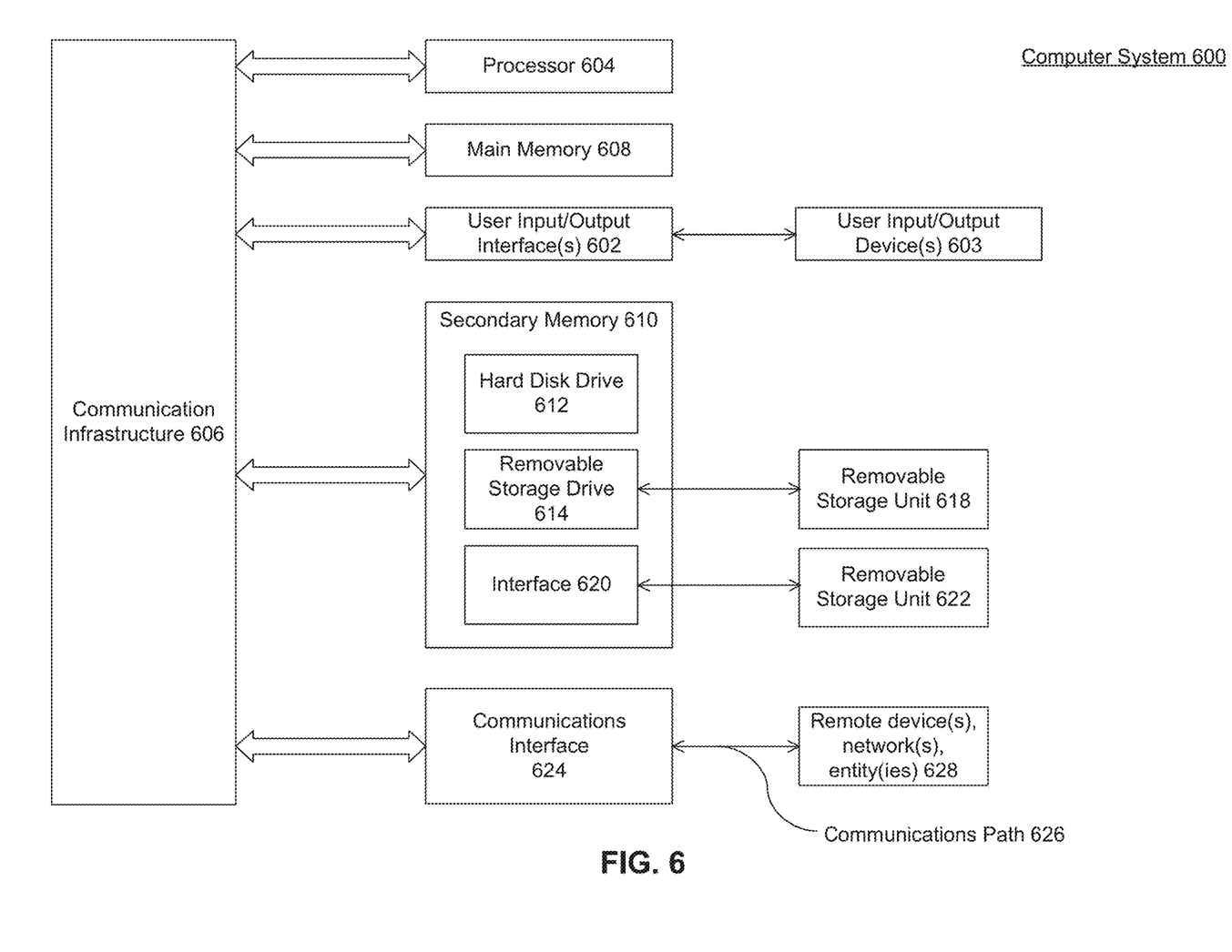
FIG. 6 illustrates an example computer system useful for implementing various embodiments.

Various embodiments may be implemented, for example, using one or more well-known computer systems, such as computer system 600 shown in FIG. 6. For example, the media device 106 may be implemented using combinations or sub-combinations of computer system 600. Also or alternatively, one or more computer systems 600 may be used, for example, to implement any of the embodiments discussed herein, as well as combinations and sub-combinations thereof. Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600 or processor(s) 604), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for training a conversational recommendation system for generating an output, having a high play-probability, based on a minimal number of iterations of conversation, comprising:
   generating, by at least one computer processor, a probabilistic pseudo-user neural network model based on at least one interest probability distribution corresponding to a pseudo-user profile;
   training, using the probabilistic pseudo-user neural network model, the conversational recommendation system to learn a recommendation policy, wherein the conversational recommendation system comprises an interest-exploration engine and a prompt-decision engine, and wherein the training includes performing one or more iterations of an iterative learning process, including:
      selecting, by the interest-exploration engine, an interest-exploration strategy based on one or more of the following: an interest-exploration policy, an earlier pseudo-user response generated by the probabilistic pseudo-user neural network model, content data, and pseudo-user interaction history;
      selecting, by the prompt-decision engine, an interest prompt based on a prompt-decision policy and the selected interest-exploration strategy;
      generating, by the probabilistic pseudo-user neural network model, another pseudo-user response based on the selected interest prompt;
      updating a reward function, corresponding to the interest-exploration engine and the prompt-decision engine, based on the another pseudo-user response; and
      updating, using a reinforcement-learning method, the interest-exploration policy and the prompt-decision policy based on at least the updated reward function; and
   generating, using the trained conversational recommendation system, a real-time recommendation having the high play-probability based on the minimal number of iterations of conversation between a user and the trained conversational recommendation system.

2. The method of claim 1, further comprising:
   terminating the iterative learning process if the another pseudo-user response comprises accepting to play a recommended media content corresponding to the selected interest prompt.

3. The method of claim 1, wherein the recommendation policy corresponds to the interest-exploration policy and the prompt-decision policy that cumulatively result in generating a pseudo-user response of accepting to play a recommended media content in a minimal number of iterations of the iterative learning process.

4. The method of claim 1, wherein the at least one interest probability distribution further comprises a long-term interest probability distribution and a short-term interest probability distribution corresponding to the pseudo-user profile.

5. The method of claim 1, wherein the another pseudo-user response comprises accepting to play a recommended media content corresponding to the selected interest prompt, quitting a conversation session with the conversational recommendation system, or generating a further pseudo-user response.

6. The method of claim 5, wherein the updating the reward function further comprises:
incrementing the reward function by a predetermined value if the another pseudo-user response comprises accepting to play the recommended media content corresponding to the selected interest prompt;
decrementing the reward function by a first value if the another pseudo-user response comprises quitting the conversation session with the conversational recommendation system; and
decrementing the reward function by a second value if the another pseudo-user response comprises generating the further pseudo-user response.

7. The method of claim 1, wherein the selecting the interest-exploration strategy further comprises:
extracting a current interest from the pseudo-user interaction history using named entity recognition; and
performing an interest prediction based on the current interest.

8. The method of claim 1, wherein the selecting the interest-exploration strategy further comprises:
selecting the interest-exploration strategy from a plurality of candidate interest-exploration strategies, including one or more of the following: exploration via an area target, exploration via a point target, exploration via a filtered target, exploration via a popular target, and exploration via a similar target.

9. The method of claim 1, wherein a response generated by the probabilistic pseudo-user neural network model is processed by an automatic speech recognition module and a natural language understanding module before being received by the interest exploration engine.

10. The method of claim 1, wherein an output of the prompt decision engine corresponding to the selected interest prompt is processed by a large language model and a text to speech module before being received by the probabilistic pseudo-user neural network model.

11. A system, comprising:
one or more memories; and
at least one processor each coupled to at least one of the memories and configured to perform operations comprising:
generating a probabilistic pseudo-user neural network model based on at least one interest probability distribution corresponding to a pseudo-user profile;
training, using the probabilistic pseudo-user neural network model, a conversational recommendation system to learn a recommendation policy, wherein the conversational recommendation system comprises an interest-exploration engine and a prompt-decision engine, and wherein the training includes performing one or more iterations of an iterative learning process, including:
selecting, by the interest-exploration engine, an interest-exploration strategy based on one or more of the following: an interest-exploration policy, an earlier pseudo-user response generated by the probabilistic pseudo-user neural network model, content data, and pseudo-user interaction history;
selecting, by the prompt-decision engine, an interest prompt based on a prompt-decision policy and the selected interest-exploration strategy;
generating, by the probabilistic pseudo-user neural network model, another pseudo-user response based on the selected interest prompt;
updating a reward function, corresponding to the interest-exploration engine and the prompt-decision engine, based on the another pseudo-user response; and
updating, using a reinforcement-learning method, the interest-exploration policy and the prompt-decision policy based on at least the updated reward function; and
generating, using the trained conversational recommendation system, a real-time recommendation having a high play-probability based on a minimal number of iterations of conversation between a user and the trained conversational recommendation system.

12. The system of claim 11, the operations further comprising:
terminating the iterative learning process if the another pseudo-user response comprises accepting to play a recommended media content corresponding to the selected interest prompt.

13. The system of claim 11, wherein the recommendation policy corresponds to the interest-exploration policy and the prompt-decision policy that cumulatively result in generating a pseudo-user response of accepting to play a recommended media content in a minimal number of iterations of the iterative learning process.

14. The system of claim 11, wherein the at least one interest probability distribution further comprises a long-term interest probability distribution and a short-term interest probability distribution corresponding to the pseudo-user profile.

15. The system of claim 11, wherein the another pseudo-user response comprises accepting to play a recommended media content corresponding to the selected interest prompt, quitting a conversation session with the conversational recommendation system, or generating a further pseudo-user response.

16. A non-transitory computer-readable medium having instructions stored thereon that, when executed by at least one computing device, cause the at least one computing device to perform operations comprising:
generating, by at least one computer processor, a probabilistic pseudo-user neural network model based on at least one interest probability distribution corresponding to a pseudo-user profile;
training, using the probabilistic pseudo-user neural network model, a conversational recommendation system to learn a recommendation policy, wherein the conversational recommendation system comprises an interest-exploration engine and a prompt-decision engine, and wherein the training includes performing one or more iterations of an iterative learning process, including:
selecting, by the interest-exploration engine, an interest-exploration strategy based on one or more of the following: an interest-exploration policy, an earlier pseudo-user response generated by the probabilistic pseudo-user neural network model, content data, and pseudo-user interaction history;
selecting, by the prompt-decision engine, an interest prompt based on a prompt-decision policy and the selected interest-exploration strategy;

generating, by the probabilistic pseudo-user neural network model, another pseudo-user response based on the selected interest prompt;

updating a reward function, corresponding to the interest-exploration engine and the prompt-decision engine, based on the another pseudo-user response; and updating, using a reinforcement-learning method, the interest-exploration policy and the prompt-decision policy based on at least the updated reward function; and generating, using the trained conversational recommendation system, a real-time recommendation having a high play-probability based on a minimal number of iterations of conversation between a user and the trained conversational recommendation system.

17. The non-transitory computer-readable medium of claim 16, the operations further comprising:

terminating the iterative learning process if the another pseudo-user response comprises accepting to play a recommended media content corresponding to the selected interest prompt.

18. The non-transitory computer-readable medium of claim 16, wherein the recommendation policy corresponds to the interest-exploration policy and the prompt-decision policy that cumulatively result in generating a pseudo-user response of accepting to play a recommended media content in a minimal number of iterations of the iterative learning process.

19. The non-transitory computer-readable medium of claim 16, wherein the at least one interest probability distribution further comprises a long-term interest probability distribution and a short-term interest probability distribution corresponding to the pseudo-user profile.

20. The non-transitory computer-readable medium of claim 16, wherein the another pseudo-user response comprises accepting to play a recommended media content corresponding to the selected interest prompt, quitting a conversation session with the conversational recommendation system, or generating a further pseudo-user response.

* * * * *